(12) United States Patent
Madge et al.

(10) Patent No.: US 10,443,701 B2
(45) Date of Patent: Oct. 15, 2019

(54) PLANETARY GEAR BOX ASSEMBLY

(71) Applicant: ROLLS-ROYCE plc, London (GB)

(72) Inventors: Jason J Madge, Dursley (GB);
Jonathan P Bradley, Bristol (GB)

(73) Assignee: ROLLS-ROYCE plc, London (GB)

( * ) Notice: Subject to any disclaimer, the term of this patent is extended or adjusted under 35 U.S.C. 154(b) by 172 days.

(21) Appl. No.: 15/703,535

(22) Filed: Sep. 13, 2017

(65) Prior Publication Data

US 2018/0100573 A1    Apr. 12, 2018

(30) Foreign Application Priority Data

Oct. 7, 2016   (GB) .................................. 1617033.4

(51) Int. Cl.
| | |
|---|---|
| F16H 57/08 | (2006.01) |
| F16H 57/023 | (2012.01) |
| F02C 7/36 | (2006.01) |
| F16H 57/04 | (2010.01) |
| F16H 1/28 | (2006.01) |
| F02K 3/06 | (2006.01) |
| F16H 57/00 | (2012.01) |

(52) U.S. Cl.
CPC .............. *F16H 57/023* (2013.01); *F02C 7/36* (2013.01); *F02K 3/06* (2013.01); *F16H 1/2836* (2013.01); *F16H 57/0479* (2013.01); *F16H 57/082* (2013.01); *F05D 2260/40311* (2013.01); *F16H 57/0031* (2013.01)

(58) Field of Classification Search
CPC ..... F16H 57/0031; F16H 57/08; F16H 57/082
See application file for complete search history.

(56) References Cited

U.S. PATENT DOCUMENTS 2,095,794 A * 10/1937 Corbin .................. F16H 57/082
                                                           475/338
3,071,986 A *  1/1963 Schwerdhofer ........ B62M 11/14
                                                           475/331
(Continued)

FOREIGN PATENT DOCUMENTS

CN          203477266 U     3/2014
DE     10 2010 017463 A1   12/2011
(Continued)

OTHER PUBLICATIONS

Feb. 23, 2018 Search Report issued European Patent Application No. 17 19 0873.
(Continued)

*Primary Examiner* — Sherry L Estremsky
(74) *Attorney, Agent, or Firm* — Oliff PLC

(57) ABSTRACT

A planetary gear box assembly, comprises a sun gear and a plurality of planet gears in meshing engagement with the sun gear; the planet gears in meshing engagement with a ring gear which encircles the plurality of planet gears, each planet gear mounted for rotation in a planet carrier by means of a bearing pin wherein a bore in the planet carrier for receiving the bearing pin is parallel. The bearing pin includes a small axially tapered section adjacent one or both ends and the assembly further comprises a tapered sleeve configured to interference fit between a radially inner wall surface of the parallel bore and a radially outer surface of the or each axially tapered section.

12 Claims, 4 Drawing Sheets

(56) References Cited

U.S. PATENT DOCUMENTS

| | | | |
|---|---|---|---|
| 4,771,654 A * | 9/1988 | Shinjo | F16H 1/2836 |
| | | | 475/31 |
| 10,228,034 B2 * | 3/2019 | Yamasaki | F16H 25/2252 |
| 2010/0197445 A1 | 8/2010 | Montestruc | |
| 2012/0192570 A1 | 8/2012 | McCune et al. | |

FOREIGN PATENT DOCUMENTS

| | | | | |
|---|---|---|---|---|
| EP | 1 925 856 A2 | | 5/2008 | |
| GB | 1423145 A | | 1/1976 | |
| JP | 60065940 A | * | 4/1985 | |
| JP | 04341641 A | * | 11/1992 | F16H 57/082 |

OTHER PUBLICATIONS

Mar. 29, 2017 Search Report issued in British Patent Application No. GB1617033.4.

* cited by examiner

PLANETARY GEAR BOX ASSEMBLY

TECHNICAL FIELD

The present invention concerns planetary gear boxes, in particular (but not exclusively) when used for transmission of speed reduction between rotating shafts of a gas turbine engine.

BACKGROUND

Planetary gear boxes are known. FIG. 1 shows a sectional view of a known planetary gear box arrangement providing speed reduction between two co-axially aligned shafts 2, 6. The gear box comprises a sun gear 1 centred on a centreline C-C. The sun gear 1 is mounted to an input shaft 2 which is mounted for rotation in a first bearing 3. The sun gear 1 meshes with an array of planet gears 4 (only one of which is shown) arranged around the toothed circumference of the sun gear 1. A ring gear 5 encircles and meshes with the planet gears 4. The ring gear 5 is fixed in position and so, upon rotation of the sun gear 1, the planetary gears 4 are forced to rotate around their individual axes A-A and travel within the ring gear 4 and around the sun gear 1.

The planet gears 4 are each mounted for rotation in a planet carrier 7 which in turn connects to an arm 6a of an output carrier 6b via a spherical bearing 7a. A bearing pin 10 locates the bearing 7a in a bore of the planet carrier 7. The arm 6a is arranged to transmit the output via an output shaft 6 which nominally shares a common axis C-C with the input shaft 2. The output shaft 6 is further mounted for rotation with respect to a static casing by means of a bearing or pivot 9. The planet carrier 7 is arranged for rotation about the axis C-C by means of a bearing 8. The planet carrier 7 and the output shaft 6 rotate together.

It will be appreciated that the bearing pin 10 between the planet carrier 7 and a planet gear 4 in high capacity power gearboxes is loaded due to torque and centrifugal effects. The connection between the planet carrier 7 and bearing pin 10 must transmit the full torque of the gearbox, as well as centrifugal loads arising due to the planet gear orbiting. At each bearing pin 10, these loads can be comparable to the thrust of a jet engine. Consequently, unhelpful deflections occur between these components which are very challenging to control.

It is known to use interference fits between the planet carrier 7 and bearing pin 10. However, with every increase in scale of the gear box, assembly by interference fit becomes a greater challenge. If insufficient preload/fit is used, the join between the pin 10 and planet carrier 7 can open up allowing the planet gear 4 to move radially under centrifugal loading, taking it closer to the ring gear 5 and further from the sun gear 1. Consequences may include gear overstressing, excessive gear noise, or weakening of gear teeth due to thinning. Other side effects such as fretting can also cause operational issues if too much movement occurs at this interface.

In alternative arrangements, the sun gear may be fixed in position and the ring gear rotated to drive the planet gears.

Outside of gear box design, it is known to use tapered bores to provide improved interference fits between concentric shafts. For example, a tapered journal and bore may be driven directly together in a "taper-taper" arrangement. In other arrangements, a tapered sleeve is driven between a tapered surface and a parallel surface. Such joins may be assembled "dry" or "wet". In a dry assembly, reliance is entirely upon an axial load to engage the components. In a wet assembly, a hydraulic fluid (typically oil) may be injected under very high pressure into a space between the components. The fluid serves to separate and lubricate the surfaces during tightening and extraction. The fluid is typically supplied through a gallery which is part of the tapered sleeve.

SUMMARY OF INVENTION

In accordance with the present disclosure there is provided a planetary gear box assembly comprising a sun gear and a plurality of planet gears in meshing engagement with the sun gear; the planet gears in meshing engagement with a ring gear which encircles the plurality of planet gears, each planet gear mounted for rotation in a planet carrier by means of a bearing pin received in a bore in the planet carrier, the bearing pin including a small axially tapered section adjacent one or both ends and the assembly further comprising a tapered sleeve configured to interference fit between a radially inner wall surface of the bore and a radially outer surface of the or each axially tapered section.

Without limitation, gear box assemblies in accordance with the invention may be used for transmission of speed reduction between rotating shafts. One such application is between rotor shafts in a gas turbine engine.

The planet carrier may include a gallery for the distribution of fluid to the parallel bore. In addition or in the alternative, the planet bearing pin may include a gallery for the distribution of fluid to the bearing pin—tapered sleeve interface. The tapered sleeve may include a circumferential groove on either or both of a bore wall facing side and a bearing facing side. In the alternative or in addition, a circumferential groove may be provided in one or both of the parallel bore wall and a tapered sleeve facing surface of the bearing pin. The grooves provide space into which the fluid can flow and be dispersed about the interfaces between the tapered sleeve and each of the parallel bore wall surface and the bearing pin surface.

In an option, the end or ends of the bearing pin to which the tapered section is adjacent may extend in parallel to provide a uniform circumference section which, in use, extends beyond an inserted tapered sleeve. The assembly may further comprise a retaining nut arranged to abut the planet carrier and tapered sleeve and retain the sleeve in a preferred axial position with respect to the planet gear axis of rotation.

The tapered sleeve is typically annular having a radially extending wall from which two taper defining walls extend in a substantially axial direction. One of the taper defining walls may extend orthogonally to the radially extending wall. The taper on the tapered sleeve need not be large, for example the taper is 15 degrees or less. In some embodiments, the taper is in the range from 1 to 5 degrees. In some applications, it may be desirable to minimise the thickness and/or weight of the tapered sleeve. The annular sleeve may have a maximum radial thickness of 15 mm or less. In some embodiments, the annular sleeve has a maximum radial thickness of 5 mm or less.

BRIEF DESCRIPTION OF FIGURES

Embodiments of the invention will now be further described with reference to the accompanying Figures in which.

DETAILED DESCRIPTION OF EMBODIMENTS

Figure 1:
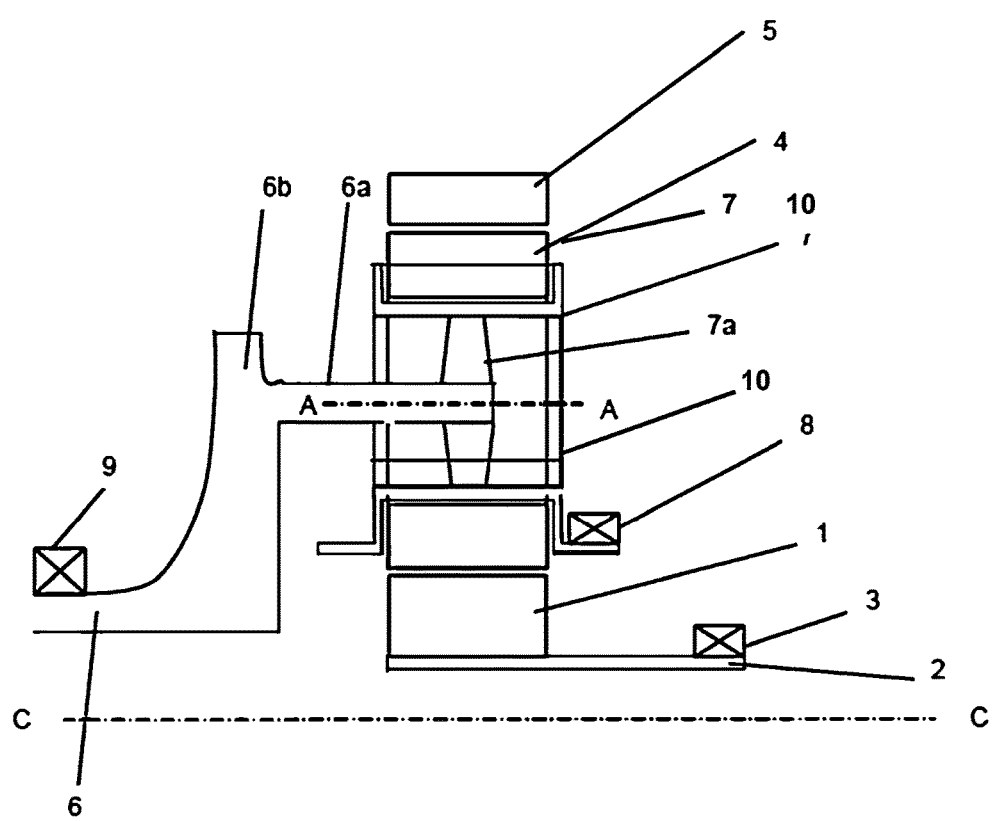
FIG. 1 shows a sectional view of a known planetary gear box arrangement.

FIG. 1 has been described above.

Figure 2:
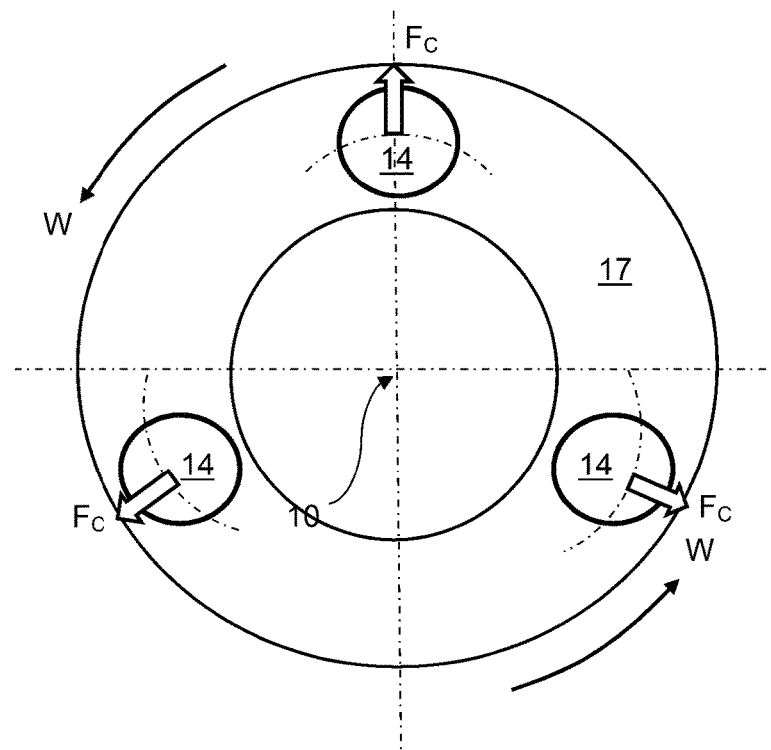
FIG. 2 shows centrifugal loading arising in a gear assembly of prior known construction.

FIG. 2 illustrates a planet carrier 17 holding three planet gear assemblies 14 which are substantially equally circumferentially spaced about the planet carrier 17. The planet carrier rotates in a direction W about a centre 10. Centrifugal forces $F_c$ act to push the planet gear assemblies 14 radially outwards.

Figure 3:
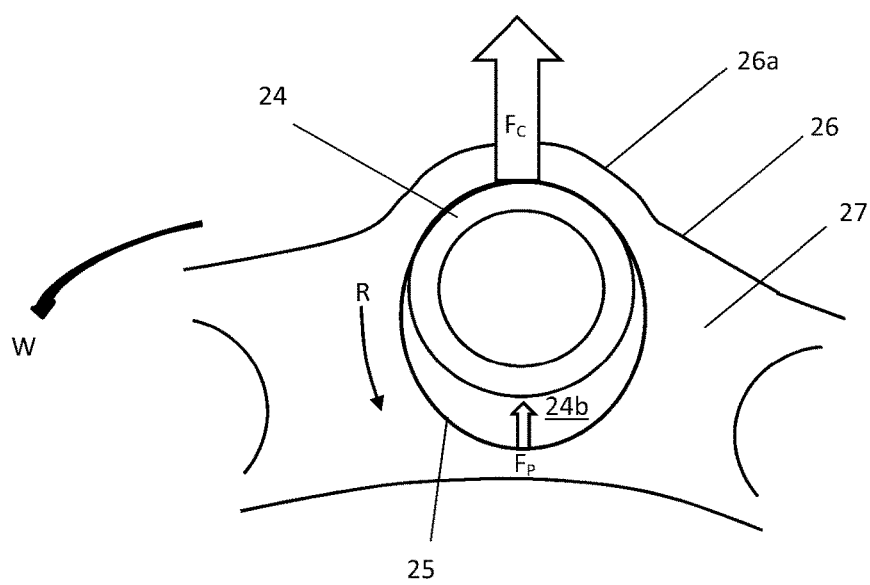
FIG. 3 shows in greater detail the effects of centrifugal loading on the gear assembly of FIG. 2.

FIG. 3 illustrates in more detail the effects of these centrifugal forces on individual planet gear assemblies. In the figure, a planet carrier 27 has a bore 25 into which a bearing pin 24 of a planet gear assembly is located. The planet carrier 27 rotates in a direction W. The rotation W generates a centrifugal load $F_c$ on the bearing pin 24 which tends to push against the wall of bore 25 adjacent the radially outer rim 26 of the planet carrier 27. This can result in a local deformation 26a of the outer rim 26 in this region. A centrifugal load $F_p$ is also generated in the planet gear 24b which acts on the bearing pin 24 causing it to deform from a circular to a more oval cross-section resulting in a gap between the wall of the bore 25 and an outer surface of the pin 24. Radial strain R results in the direction of the arrow as shown. As can be seen there is movement of the centreline of the gear 24b. This misalignment can lead to the aforementioned problems of gear overstressing, excessive gear noise, or weakening of the gear teeth due to thinning.

Figure 4:
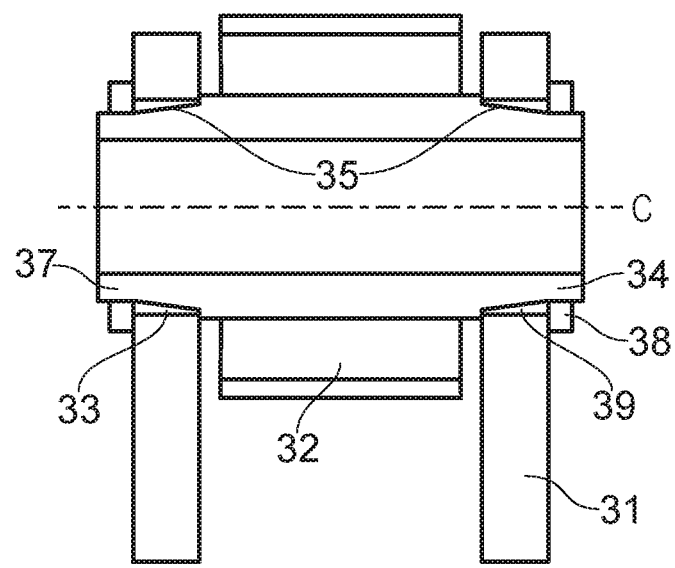
FIG. 4 shows an embodiment of an assembly in accordance with the invention.

FIG. 4 shows an embodiment of an assembly in accordance with the invention. A planet carrier 31 has a circumferential array of bores 33 into which a bearing pin 34 carrying a planet gear 32 is received. The planet gear 32 and bearing pin 34 assembly has a centre C. A centre portion of the bearing pin 34, on which the planet gear 32 is located, has a uniform outer diameter. Towards opposing ends of the bearing pin 34 the diameter converges to form tapered regions 35 which locate in radially extending walls of the planet carrier 31. Lastly, at each of the opposing ends are end portions 37 of uniform diameter. The end portion uniform diameter is smaller than the centre portion uniform diameter. The end portions 37 protrude axially outwardly from the radially extending walls of the planet carrier 31. Tapered sleeves 39 are wedged between the tapered sections 35 and the wall of the bore 33 to secure the radial position of the bearing pin 34 about centre C. The end portions 37 may be threaded. Retaining nuts 38 are secured onto the end portions 37 abutting against the planet carrier 31 whereby to prevent axial movement of the bearing pin 34.

Figure 5:
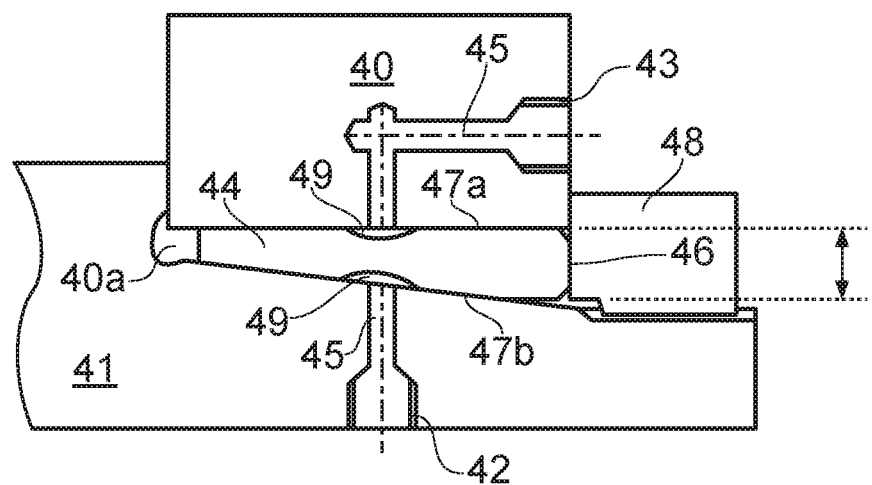
FIG. 5 shows a more detailed view of an embodiment of an assembly in accordance with the invention.

FIG. 5 shows optional embellishments of the arrangement of FIG. 4. The Figure shows a planet carrier wall 40 and a section of a carrier pin 41 located in a bore 40a of the planet carrier wall 40. A tapered sleeve 44 is wedged between a tapered section of the pin 41 and the carrier 40. The tapered sleeve 44 has a radially extending surface 46 and second and third surfaces 47a, 47b which converge to form the wedge shaped cross section. The second surface 47a extends substantially orthogonally to the radially extending surface 46 and the third surface 47b converges from the radially extending surface towards the second surface forming a wedge angle of about 5 degrees. Each of the second and third surfaces 47a, 47b has a circumferential groove 49. Each of the bearing pin 41 and planet carrier 40 is provided with an inlet 42, 43 into which a hydraulic fluid may be introduced. A gallery of conduits 45 outlets into interfaces between the bearing pin 41 and third surface 47b of the tapered sleeve 44, and between the planet carrier wall 44 and the second surface 47a of the tapered sleeve 44. Fluid delivered through the conduits 45 can pool in the circumferential grooves 49 and disperse across the interfaces. Building of hydraulic pressure in the grooves can assist in separating the interfaces, allowing the tapered sleeve to be forced further into the space between the carrier and the pin during assembly. This application of hydraulic pressure may also be used to separate the interfaces in a disassembly operation. When assembled, the radially extending surface 46 sits substantially in alignment with a radially extending face of the planet carrier wall 40. Retaining nut 48 is screwed onto the end of the bearing pin 41 and abuts against the aligned surfaces of the carrier 40 and tapered sleeve 44. Introduction of fluid during assembly and/or disassembly reduces friction at the interfaces enabling easier insertion and removal of the tapered sleeve 44.

Since fluid is supplied through galleries 45 in the carrier 40 and pin 41, the tapered sleeve 44 can be made very thin, allowing the carrier to be made larger and stiffer without compromise on weight of the assembly.

Figure 6:
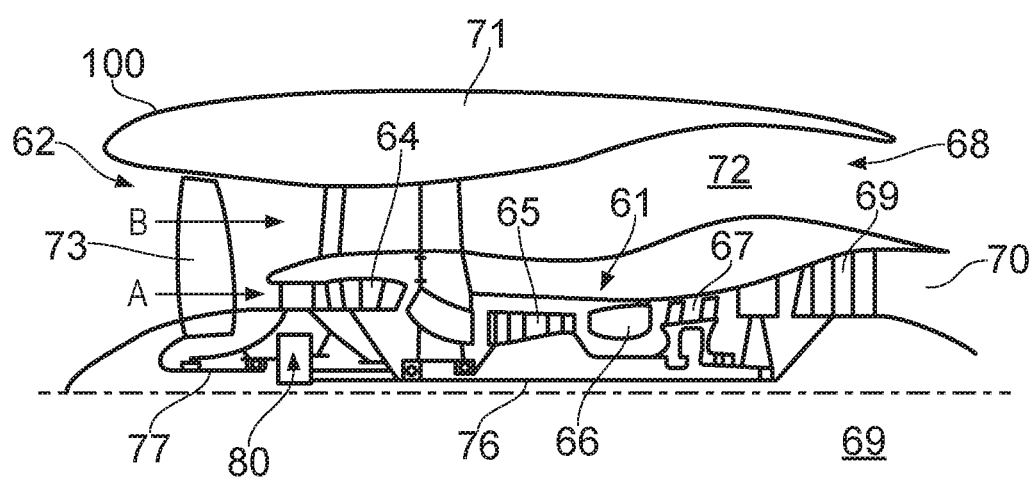
FIG. 6 shows a gas turbine engine into which a planetary gear assembly in accordance with the invention might usefully be incorporated.

Referring to FIG. 6, a two-shaft gas turbine engine 100 has a principal rotational axis 69. The engine 100 comprises an air intake 62 and a propulsive fan 73 that generates two airflows A and B. The gas turbine engine 100 comprises a core engine 61 having, in axial flow A, a low pressure booster compressor 64, a high-pressure compressor 65, combustion equipment 66, a high-pressure turbine 67, a low pressure turbine 69 and a core exhaust nozzle 70. A nacelle 71 surrounds the gas turbine engine 100 and defines, in axial flow B, a bypass duct 72 and a bypass exhaust nozzle 68. The fan 73 is attached to and driven by the low pressure turbine 69 via shaft 76 and epicyclic (planetary) gear box 80. The gear box 80 may incorporate an assembly as herein described.

The gas turbine engine 100 works in a conventional manner so that air in the core airflow A is accelerated and compressed by the high pressure booster compressor 64 and directed into the high pressure compressor 65 where further compression takes place. The compressed air exhausted from the high pressure compressor 65 is directed into the combustion equipment 66 where it is mixed with fuel and the mixture combusted. The resultant hot combustion products then expand through, and thereby drive the high pressure and low pressure turbines 67, 69 before being exhausted through the nozzle 70 to provide some propulsive thrust. The high pressure turbine 67 drives the high pressure compressor 65 by a suitable interconnecting shaft. The fan 73 normally provides the majority of the propulsive thrust.

The low pressure turbine shaft 76 together with the epicyclic (planetary) gear box 80 and a fan input shaft 77 provide a transmission system for reducing the speed of the turbine 69 to an appropriate speed for the fan 73.

Other gas turbine engines to which the present disclosure may be applied may have alternative configurations. By way of example such engines may have an alternative number of interconnecting shafts (e.g. three) and/or an alternative number of compressors and/or turbines.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A planetary gear box assembly comprising a sun gear and a plurality of planet gears in meshing engagement with the sun gear; the planet gears in meshing engagement with a ring gear which encircles the plurality of planet gears, each planet gear mounted for rotation in a planet carrier by means of a bearing pin received in a bore in the planet carrier, the bearing pin including a small axially tapered section adjacent one or both ends and the assembly further comprising a tapered sleeve configured to interference fit between a radially inner wall surface of the bore and a radially outer surface of the or each axially tapered section.

2. A planetary gear box assembly as claimed in claim 1 wherein the planet carrier includes a gallery for the distribution of fluid to an interface between the wall surface of the parallel bore and a surface of the tapered sleeve.

3. A planetary gear box assembly as claimed in claim 1 wherein the bearing pin includes a gallery for the distribution of fluid to a radially outer surface of an axially tapered section of the bearing pin and a surface of the tapered sleeve.

4. A planetary gear box assembly as claimed in claim 1 wherein a circumferential groove is provided in at least one tapering surface of the tapered sleeve.

5. A planetary gear box assembly as claimed in claim 1 wherein a circumferential groove is provided in one or both of a wall of the parallel bore and a radially outer surface of a tapered section of the bearing pin which, when assembly is complete, faces a tapering surface of the tapering sleeve.

6. A planetary gear box assembly as claimed in claim 1 wherein an end or ends of the bearing pin to which the tapered section is adjacent extends in parallel to provide a uniform diameter section which, in use, extends beyond an inserted tapered sleeve and a retaining nut configured to be threaded onto the end of uniform diameter section so as to abut the planet carrier and tapered sleeve whereby to retain the sleeve in a preferred axial position with respect to an axis of rotation of the planet gear.

7. A planetary gear box assembly as claimed in claim 1 wherein the tapered sleeve is annular and has a radially extending wall from which two tapering walls extend in a substantially axial direction, a first of the tapering walls extending substantially orthogonally to the radially extending wall and a second of the tapering walls converging from the radially extending wall towards the first of the tapering walls whereby to form a wedge-shaped cross section.

8. A planetary gear box assembly as claimed in claim 1 wherein the taper angle of the tapered sleeve is 15 degrees or less.

9. A planetary gear box assembly as claimed in claim 8 wherein the taper angle of the tapered sleeve is in the inclusive range from 1 to 5 degrees.

10. A planetary gear box assembly as claimed in claim 1 wherein the tapered sleeve has a maximum radial thickness of 15 mm or less.

11. A planetary gear box assembly as claimed in claim 10 wherein the tapered sleeve has a maximum radial thickness of 5 mm or less.

12. A gas turbine engine incorporating a planetary gear box assembly connecting concentrically aligned rotatable shafts in a manner which serves, in use, to transmit a speed reduction between the shafts, the planetary gear box assembly having a configuration as set forth in claim 1.

* * * * *